(12) United States Patent
Smithson et al.

(10) Patent No.: US 6,247,365 B1
(45) Date of Patent: Jun. 19, 2001

(54) SAFETY RESTRAINT

(75) Inventors: Alan Smithson; David Blackadder, both of Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/408,015

(22) Filed: Sep. 29, 1999

(30) Foreign Application Priority Data

Oct. 13, 1998 (GB) .................................................. 9822329

(51) Int. Cl.[7] .............................. G01P 15/00; B60R 22/40
(52) U.S. Cl. ...................................... 73/514.37; 242/384.5
(58) Field of Search ............................ 73/514.37, 514.36; 242/383.2, 384.2, 384.4, 384.5

(56) References Cited

U.S. PATENT DOCUMENTS

| 3,905,562 | * | 9/1975 | Kell | 242/107.4 |
| 3,923,269 | * | 12/1975 | Kell | 242/107.4 |
| 4,084,840 | | 4/1978 | Buff et al. | 280/744 |
| 4,127,240 | * | 11/1978 | Kell | 242/107.4 |
| 4,135,410 | * | 1/1979 | Filderman | 280/744 |
| 4,220,294 | * | 9/1980 | DiPaola | 242/107.4 |

FOREIGN PATENT DOCUMENTS

| 1357369 | 6/1974 | (GB) . |
| 1456971 | 12/1976 | (GB) . |
| 1486744 | 9/1977 | (GB) . |

* cited by examiner

*Primary Examiner*—Helen Kwok
(74) *Attorney, Agent, or Firm*—Lonnie Drayer

(57) ABSTRACT

A vehicle sensor for a retractor for a vehicle safety restraint has a sensor mass in the form of an upturned hollow cup, formed in a single piece by injection molding or die casting, resting on an upstanding post. It may be of metal or high-density plastic material. Preferably a profiled pad is fixed or mounded on the underside of the lever or on the upper surface of the cup. In this way the arrangement causes the lever to lift through substantially the same angle whichever the direction of acceleration activating the sensor. This sensor is an improvement over known sensors because it is simpler and cheaper to manufacture, easier to calibrate relatively accurately, and does not exhibit right/left dependency.

11 Claims, 4 Drawing Sheets

SAFETY RESTRAINT

FIELD OF THE INVENTION

The present invention relates to a vehicle safety restraint and particularly to a vehicle sensor for a retractor for a seat belt restraint. However such a sensor could be used in other safety restraints, for example for initiation of an inflator for an airbag.

BACKGROUND OF THE INVENTION

A vehicle sensor is responsive to acceleration and/or deceleration or tilting of a vehicle above a predetermined level. The sensor is incorporated into a traditional seat belt retractor and operates to displace a lever that engages a ratchet wheel and locks the retractor against further payout of seat belt webbing. The vehicle occupant is thereby secured against further forward motion and preventing injury by impact with internal parts of the vehicle.

Known vehicle sensors comprise an inertial mass that is displaced in its mounting by a sudden deceleration of the vehicle indicating that a crash is imminent or in progress. The mass moves a lever which is brought onto engagement with teeth on a ratchet wheel fixed to the web-winding spool of the retractor. The ratchet wheel and thus the spool are thus locked against further rotation, the seat belt webbing is prevented from further protraction and the vehicle occupant is secured.

One such known inertial mass comprises a ball resting in a hollow mount. The lever rests on the ball and lifts when the ball moves to ride up a side of the hollow. However, such a sensor requires precision engineering to obtain the required accurate tolerances and tends to exhibit undesirable friction and noise problems. The ball requires accurate machining and grinding and the production costs are high.

Another known form of sensor uses a so-called "standing man" in place of the ball. The standing man comprises a hollow lead mass mounted on a plastic cup surrounding an upstanding pin. The lever rests on the pin, which sits in sensor housing. A sudden deceleration causes the mass to tilt and this in turn lifts the pin, which lifts the lever and locks the retractor. Such a "standing man" sensor is well known to skilled people working in the field. It is a complicated assembly and thus expensive to manufacture. In addition there is an undesirably high level of friction and this degrades its sensitivity. In particular, a different angle of tilt is observed for the point at which the lever is lifted sufficiently to lock the retractor compared to the angle of tilt required to release the lever and unlock the retractor.

Another undesirable characteristic of such known sensors is that the lever is lifted by different degrees depending on the direction of the activating acceleration, since it depends on the direction in which the mass tilts. The lever tends to lift higher if the mass tilts towards the pivot point of the lever than if the mass tilts away from the pivot point. This makes the sensor more difficult to set accurately before installation in the vehicle because the calibration of the lever position is dependent on whether the retractor is to be placed on the right or on the left of a vehicle. This right/left dependency increases production costs. A substantially constant mechanical advantage would be preferable.

According to the present invention there is provided a vehicle sensor for a vehicle safety restraint comprising a sensor mass in the form of an upturned hollow cup resting on an upstanding post, and a lever resting on the cup, wherein the sensor mass is formed in one piece.

The sensor mass may be formed, for example, by injection molding or die casting or by any other method with which the skilled man would be familiar. It may be of metal or of a high-density plastic material.

According to one embodiment of the present invention the side of the lever which contacts the mass has a profiled portion. For example, a profiled pad may be molded or affixed to the underside of the lever. Alternatively the upper surface of the cup may be suitably profiled. A profile which tapers towards the lever pivot point would be one example, but a stepped profile would be another example. The relative profiles of the lever and the cooperating surface of the mass are arranged so that the lever lifts through substantially the same angle whichever way the mass is tilted and is thus independent of the direction of acceleration activating the sensor. This means that the sensor is relatively independent of its positioning in the vehicle and also results in better repeatability and improved consistency and accuracy in its performance.

In one embodiment the pad is affixed off-center relative to the center axis of the mass, and extends further on the side of the center axis away from the pivot point of the lever, than on the side towards the pivot point.

In addition the arrangement is such that the effect of friction is significantly reduced by minimizing the movement arm for each friction force acting on the sensor, and by minimizing the number of friction contact points.

The mass is formed in one piece and this may, for example, be by injection molding or by die-casting. It is considerably cheaper to manufacture than the traditional standing man type sensor mass, which comprises three different parts, or the ball type, which requires very accurate machining and grinding. Thus improvements in performance are realized with the present invention together with a cost reduction.

According to a preferred embodiment of the present invention the geometry of the hollow inside the mass is arranged so that the mass is constrained in its movement on the post so that it does not come into contact with any other component of the assembly (other than the lever). Thus degradation of the performance due to friction is reduced and also rattling noise is reduced.

The mass is preferably shaped so that its center of mass is located as far as possible from its center of rotation. This minimizes the effect of friction forces on the sensitivity of the sensor. A bell shape with a particularly bulbous skirt bottom edge is advantageous.

BRIEF DESCRIPTION OF THE DRAWINGS

For a better understanding of the present invention and to show how the same may be carried into effect, reference will now be made to the accompanying drawings, in which.

DETAILED DESCRIPTION OF THE INVENTION

Figure 1:
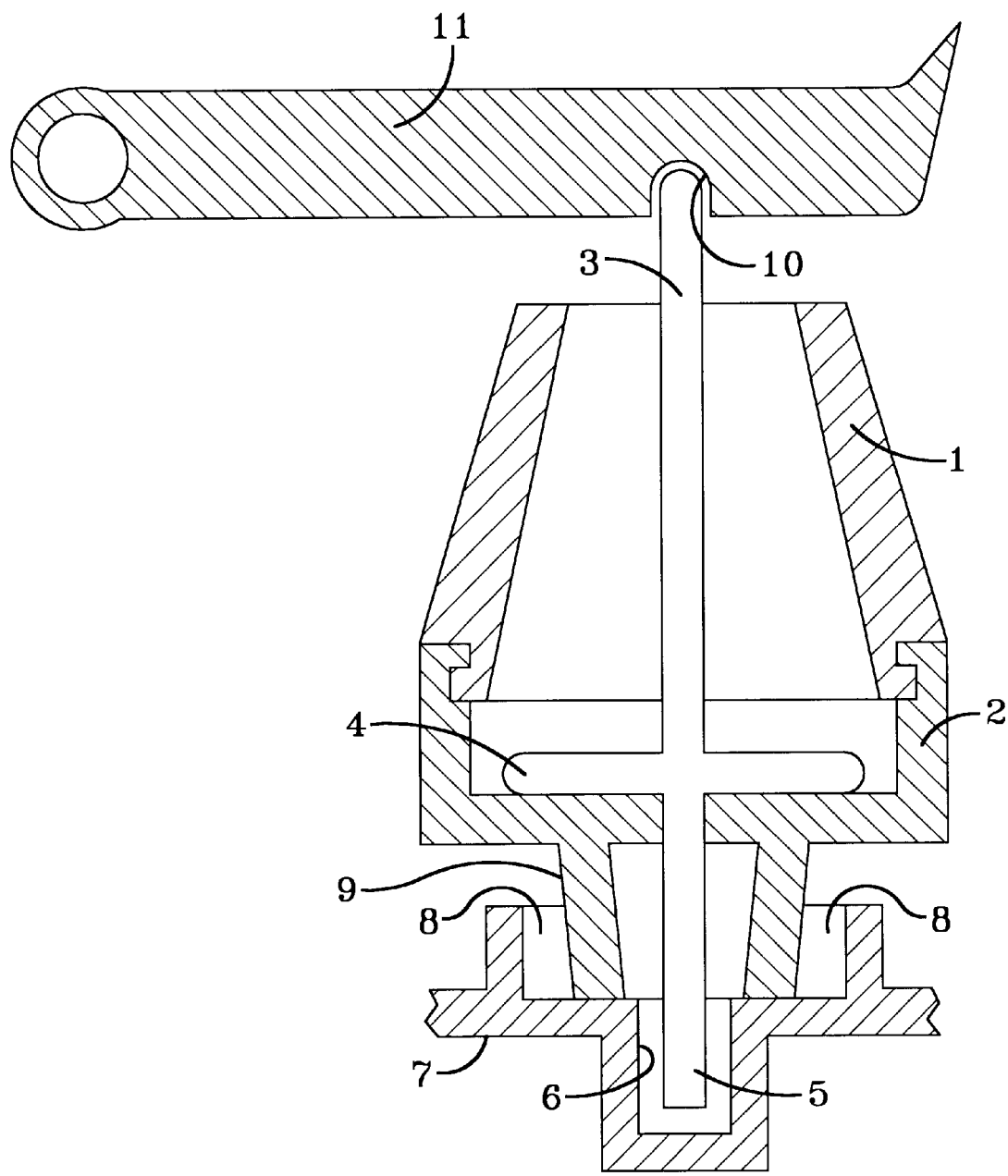
FIG. 1 is a cross sectional view of a known sensor.

A known "standing man" type of vehicle sensor is shown in FIG. 1. The sensor comprises a hollow mass 1 usually of lead, mounted on a hollow plastic cup 2. The mass 1 and cup 2 surround a pin 3 with a laterally extending base portion 4 and a tail portion 5. The tail portion 5 sits in a recess 6 in a housing 7 which also provides a seating 8 for the tapering base 9 of the cup 2. The tip of the pin 3 extends above the mass 1 and contacts a depression 10 in a pivoting lever 11.

When a sudden deceleration of the vehicle in which the sensor is mounted occurs, the lead mass 1 tilts and lifts the pin 3 in which in turn lifts the lever 11 about its pivot point. Movement of the lever 11 initiates locking of a retractor (not shown).

As can be seen, this known sensor is a complex arrangement requiring several parts to be manufactured and assembled and is thus relatively expensive. In addition there are many points of friction between moving parts, which tends to reduce its performance.

By contrast, the sensor of the present invention, as shown in FIGS. 2 to 6 have a single one piece mass 21 in the form of an upturned hollow cup. This rests on an upstanding fixed post 22. A lever 23 rests on the upper surface 24 of the mass 21.

Figure 2:
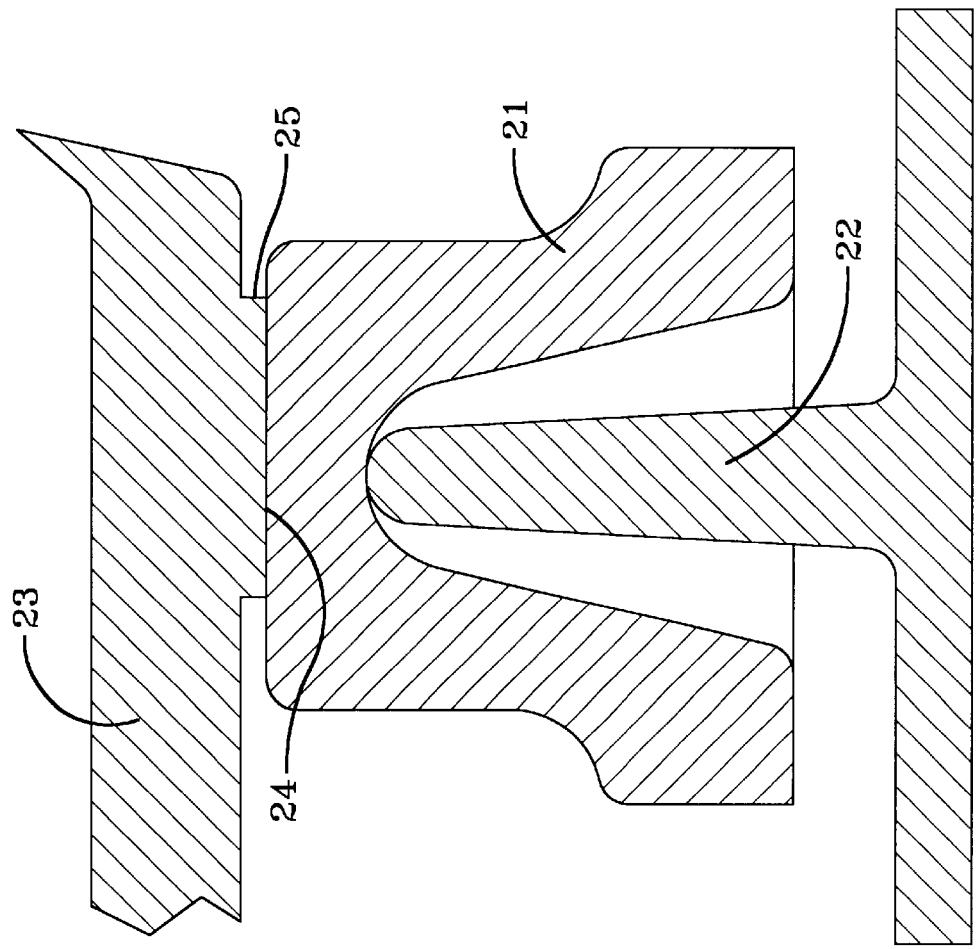
FIG. 2 is a cross sectional view of a sensor according to one embodiment of the present invention.
Figure 3:
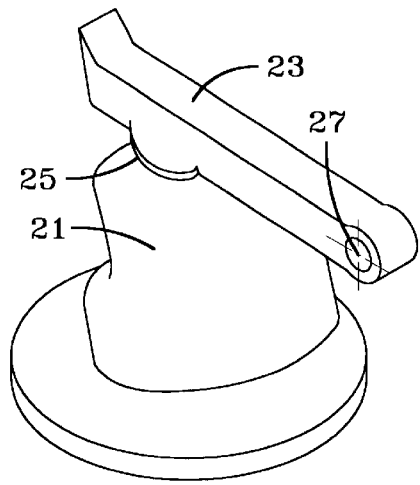
FIG. 3 is a perspective view of the sensor of FIG. 2, FIGS. 4 to 6 are cross sectional views of the sensor of FIG. 2 with the mass tilted in different directions according to the direction of acceleration.
Figure 4:
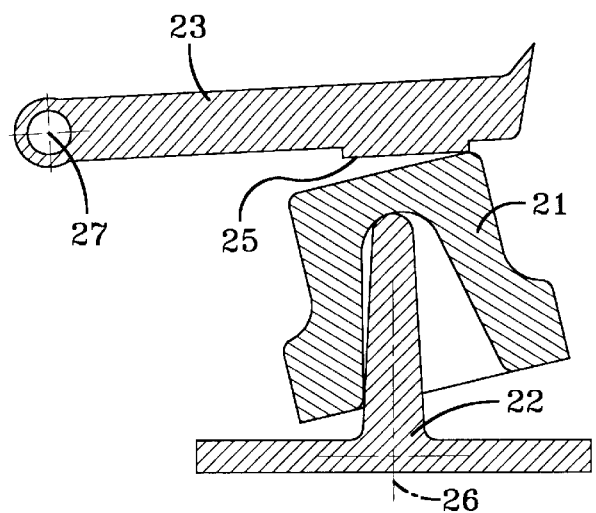
Figure 5:
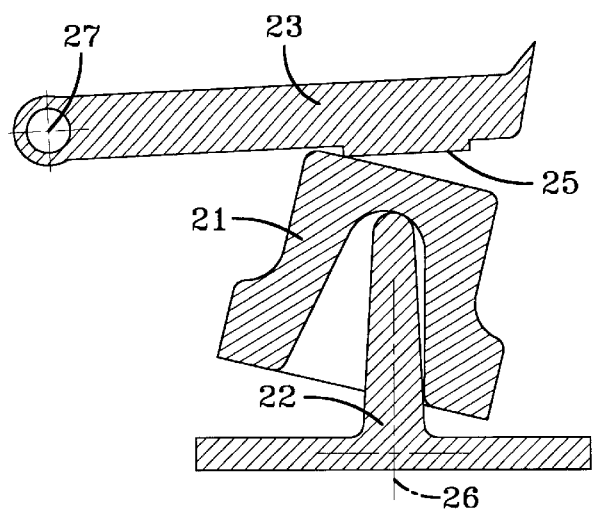

Upon sudden deceleration of the vehicle, the mass 21 swings on the tip of the post 22 and the upper surface 24 of the mass 21 tilts to push up the lever 23. Movement of the lever 23 initiates locking of the retractor (not shown). The relative geometry of the underside of the lever 23 and the upper surface 24 of the mass 21 is arranged such that the lever is moved through the same angle regardless of the direction of the applied acceleration. In the embodiment of FIG. 2 the geometry is so arranged by means of a profiled pad 25 on the underside of the lever 23. This pad 25 is molded integrally with the lever 23 as illustrated but may of course be formed separately and added as an attachment. Alternatively the profiled pad 25 may be incorporated into the top surface of the mass 21 by moulding or as an add-on. Considering the axis of the post 22 as a center line, the pad 25 extends over a greater distance on the side of the line 26 furthest from the pivot point 27 of the lever 23 than it does on the side of the line 26 closest to the pivot point 27. Thus, as it will be seen from FIGS. 4 and 5, the lever 23 rises through the same angle when the mass swings away (FIG. 4) from the pivot point 27 as when it swings towards it (FIG. 5). Thus there is generally no variation in the performance of the sensor with different directions of applied excitation. The sensor therefore exhibits an improved accuracy and consistency of performance.

Figure 6:
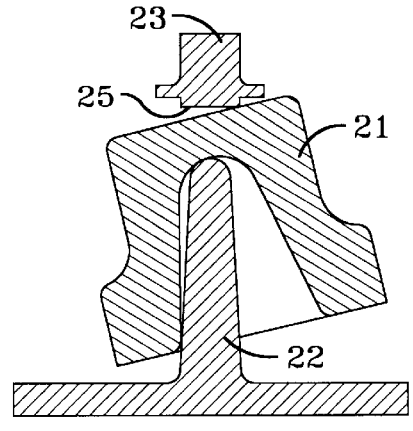

In FIG. 6 a cross section is shown transverse to the lever 23 and it can be seen that the pad 25 is dimensioned and shaped so that the lever rises through the same angle as stated above when the mass swings in a sideways direction.

The profiling of the cooperating surfaces of the lever 23 and the mass 21 may take a variety of forms other than as specifically illustrated.

Figure 7:
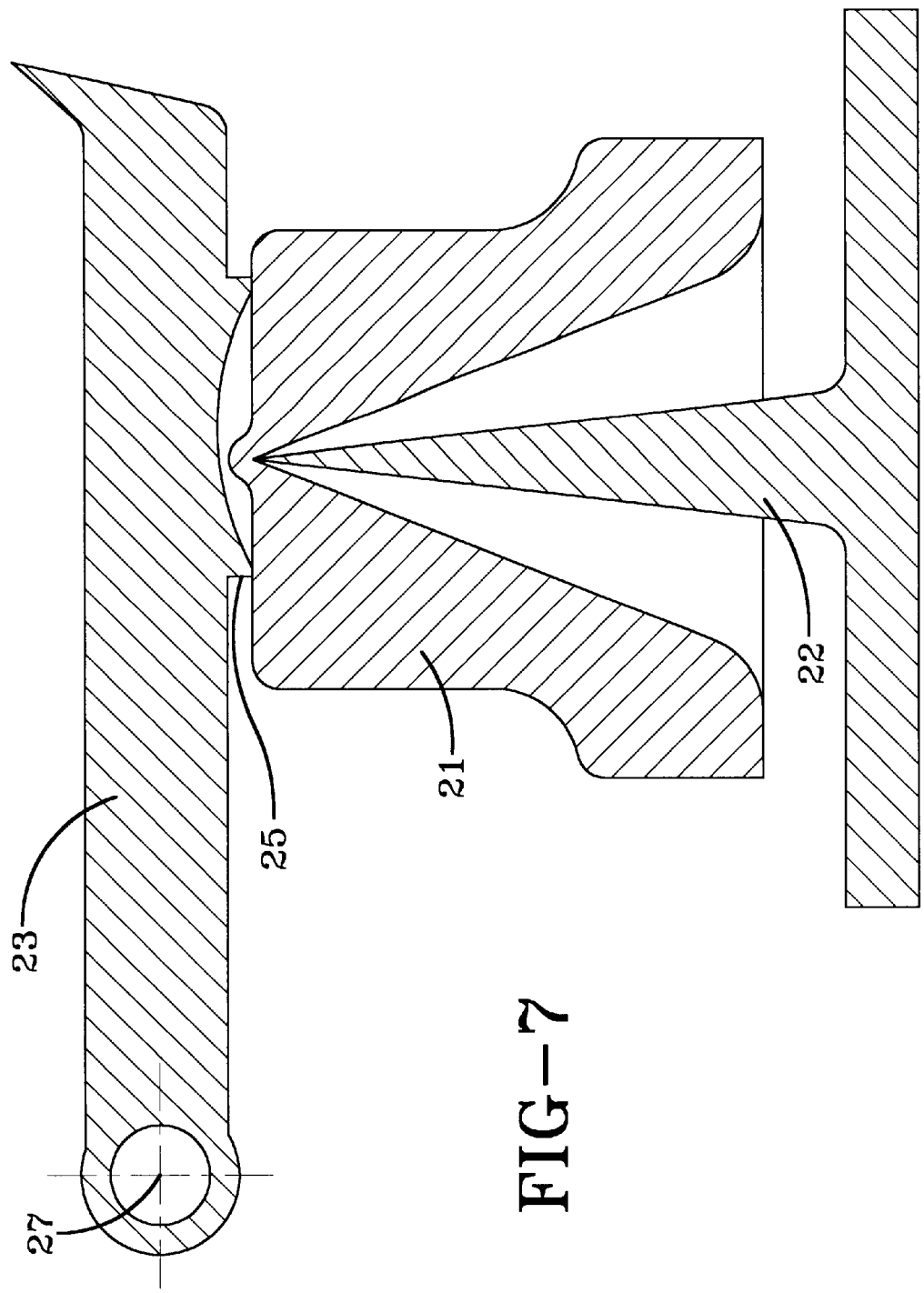
FIG. 7 is a cross sectional view of a sensor according to another embodiment of the present invention.

The prior art sensor shown in FIG. 1 has several points of friction: between the pin and the lever, between the pin and the cup, between the pin and the housing, and between the mass and the housing. It is very difficult to minimize all of these sources of friction without increasing the manufacturing costs substantially. By contrast, in the sensor of the invention there are only two sources of friction: between the mass 21 and the lever 23 and between the mass 21 and the post 22. The effect of the friction on the sensitivity of the sensor is reduced if the distance of these friction sources is sited close to the pivot point of the mass, i.e. close to the center of the radius of the tip of the post 22. In this way the friction forces effectively act over a small distance and thus the torque applied to the mass by the friction forces is reduced. This is the situation in the embodiment shown in FIG. 7. The post 22 is formed with a sharp tip, i.e. with a minimum radius of curvature, and the mass 21 is formed with a thin upper wall so that the tip of the post 22 is at the same level as the top of the mass. In this embodiment friction torque is reduced to zero since the distance between the tip of the post 22 and the top plane of the mass 21 is zero. This embodiment also shows a concave surface to the profiled pad 25. A concave surface may also be used in the embodiment of FIGS. 2 to 6.

The mass 21 of FIGS. 2 to 6 is formed in a bell shape with thicker preferably bulbous shaped walls in the lower part of the bell than in the upper part so that the center of gravity of the mass is as low as possible, and thus as far from the tip of the post 22 as possible.

Many changes and modifications in the above described embodiments of the invention can, of course, be carried out without departing from the scope thereof. Accordingly, that scope is intended to be limited only by the scope of the appended claims.

What is claimed is:

1. A vehicle sensor for a vehicle safety restraint comprising:
   (a) a sensor mass in the form of an upturned hollow cup resting on an upstanding post, the sensor mass is formed in one piece;
   (b) a lever resting on the upturned hollow cup further comprising a profiled pad; and
   (c) said profiled pad is arranged off-center relative to a center axis of said sensor mass, and extends further on the side of the center axis away from a pivot point of the lever, than on the side toward the pivot point, the lever lifts through substantially the same angle independently of the direction of acceleration activating the mass sensor.

2. The vehicle sensor according to claim 1 wherein said sensor mass is formed by injection molding.

3. The vehicle sensor according to claim 1 wherein said sensor mass is formed by die casting.

4. The vehicle sensor according to claim 1 formed of metal.

5. The vehicle sensor according to claim 1 formed of a high-density plastics material.

6. The vehicle sensor according to claim 1 wherein one side of said lever contacts said mass and said one side has a profiled portion.

7. The vehicle sensor according to claim 6 wherein the profiled portion has a profile which tapers towards the lever pivot point.

8. The vehicle sensor according to claim 6 wherein the profiled portion is stepped.

9. The vehicle sensor according to claim 1 wherein the mass has a hollow inside which has a geometry arranged so that the movement of the mass is constrained on the post.

10. The vehicle sensor according to claim 1 wherein said mass is shaped so that the center of mass of the mass sensor is located as far as possible from the center of rotation of the mass sensor.

11. The vehicle sensor according to claim 10 wherein the mass is a bell shape with a bulbous skirt bottom edge.

* * * * *